No. 682,022. Patented Sept. 3, 1901.
P. M. BENSETH.
FISH TRAP.
(Application filed Feb. 26, 1901.)
(No Model.) 2 Sheets—Sheet 1.
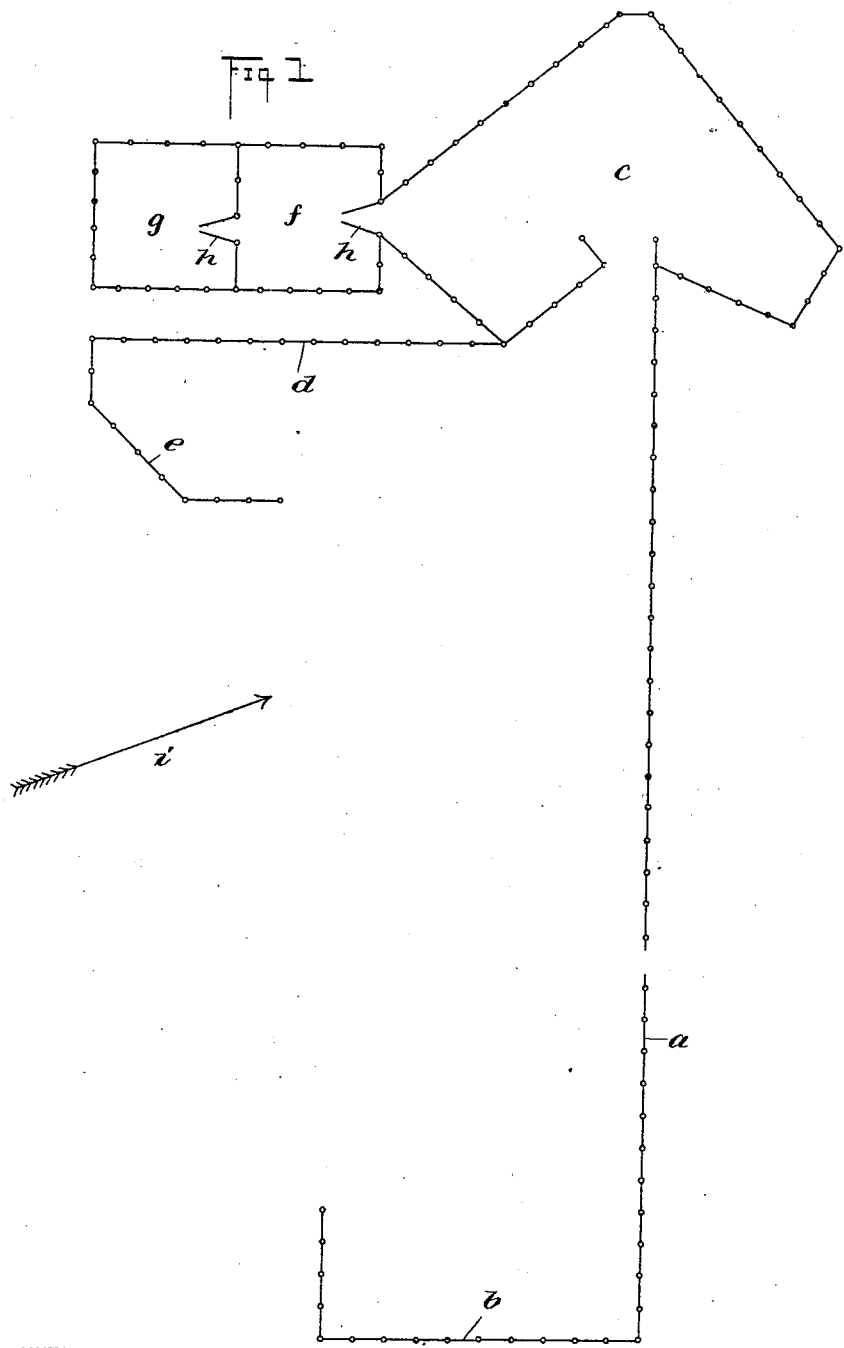

No. 682,022. Patented Sept. 3, 1901.
P. M. BENSETH.
FISH TRAP.
(Application filed Feb. 26, 1901.)
(No Model.) 2 Sheets—Sheet 2.
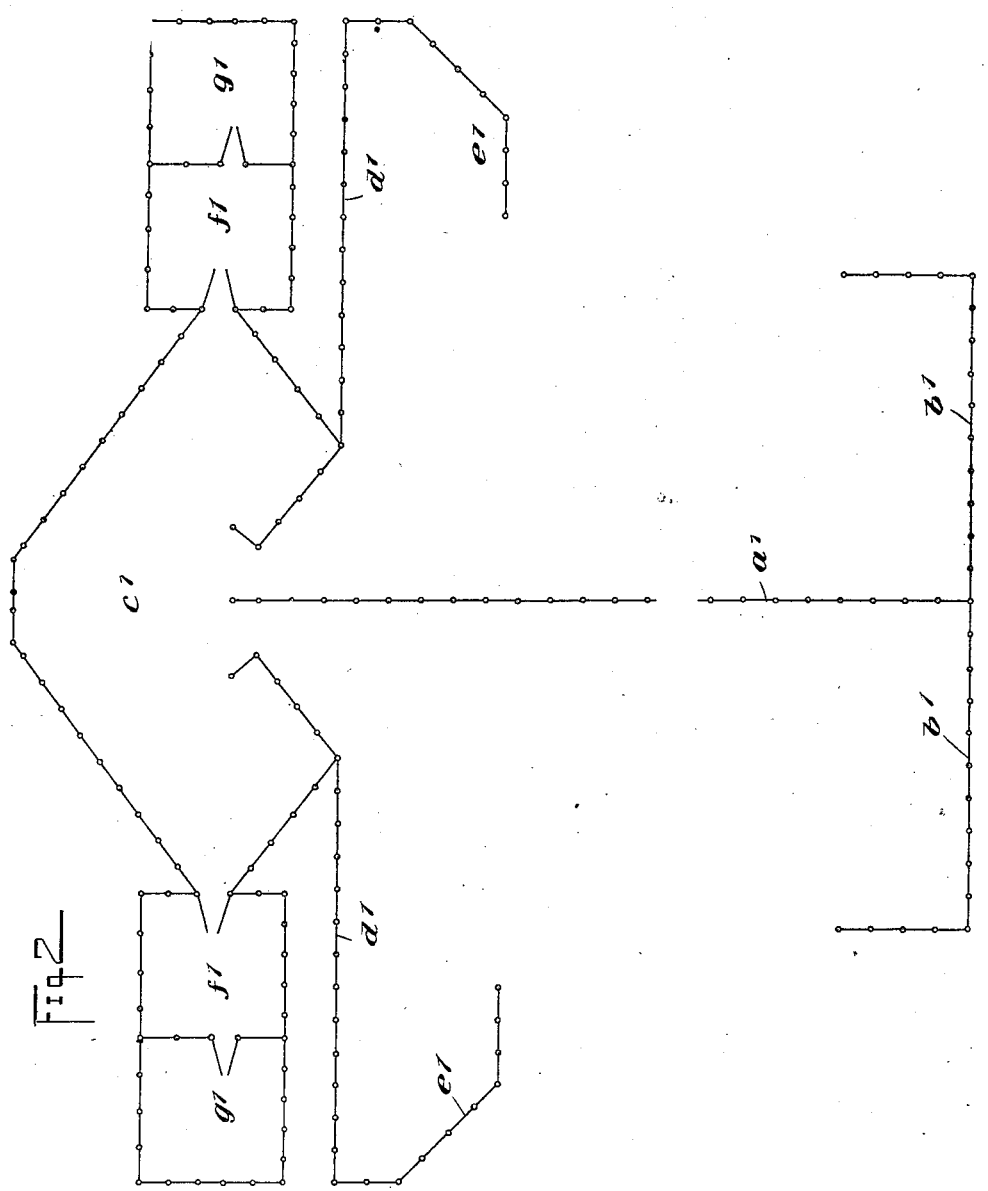
WITNESSES:
INVENTOR
Peder M. Benseth
BY
ATTORNEYS

UNITED STATES PATENT OFFICE.

PEDER M. BENSETH, OF FAIRHAVEN, WASHINGTON.

FISH-TRAP.

SPECIFICATION forming part of Letters Patent No. 682,022, dated September 3, 1901.

Application filed February 26, 1901. Serial No. 48,882. (No model.)

*To all whom it may concern:*

Be it known that I, PEDER M. BENSETH, a citizen of the United States, and a resident of Fairhaven, in the county of Whatcom and State of Washington, have invented a new and Improved Fish-Trap, of which the following is a full, clear, and exact description.

This invention relates to a fish-trap of that class in which the traps are built of piles driven in the bottom of a body of water and having a mesh of some sort hung on them. The trap is adapted especially for use in fishing for salmon. These traps have generally been composed of a "lead," which is a web of mesh leading offshore and at the outer end of which is a "heart" or primary inclosure, into which the fish are directed by the lead, and with the heart or primary inclosure communicates a "pot" and a "crib" or "spiller," these latter-named elements constituting the secondary inclosures, in which the fish are finally entrapped. All of these inclosures lie, according to previously-constructed traps, in range of the lead. In setting the trap the lead is placed across the course of the flood-tide and the fish strike the lead and follow it offshore until they enter the various inclosures and are imprisoned therein. I have found by practical experience that the salmon in passing along the lead and upon entering the heart or primary inclosure finding themselves entrapped will turn back and swim against the tide. In the various traps heretofore employed this action will tend to take them back from whence they came and out of the heart and they will be forced or enticed into the pot or secondary inclosure only by the pressure of numbers of fish behind them, which sometimes is so great that the fish behind practically force the fish ahead into the trap. If, however, the pot and the other secondary inclosures of the trap be placed at the side of the heart at right angles to the lead, the secondary inclosure or inclosures will then lie directly in the path of the fish returning against the flood-tide and the fish will then pass by a natural course into the secondary inclosures of the trap. It accordingly follows that a trap thus constructed will be much more effective than those now in use. Following this theory, my invention consists in a trap having the lead and the heart as heretofore, but having the pot and the other secondary inclosures of the trap communicating with the side of the heart as contradistinguished from the end, so that the pot and the spiller will bear at right angles to the lead instead of in range therewith.

This specification is a specific description of two forms of the invention, while the claim is a definition of the actual scope thereof.

Reference is to be had to the accompanying drawings, forming a part of this specification, in which similar characters of reference indicate corresponding parts in both views.

Figure 1 is a diagrammatic view of the invention, and Fig. 2 is a similar view showing the double form of the trap.

The drawings are supposed to represent the conventional structure of fish-traps—that is to say, comprising the piles with the web hung between them.

In Fig. 1, $a$ represents the lead, the hook $b$ of which is inshore.

$c$ represents the heart, into which the outer end of the lead projects.

$d$ indicates the jigger with its hook $e$, the jigger being virtually a secondary lead which passes from the mouth of the heart out at right angles to the lead $a$.

$f$ indicates the pot, and $g$ the crib or spiller, which communicate with each other and with the heart $c$ by the tunnels $h$, which are commonly employed. As shown in Fig. 1, the pot $f$ and crib $g$ are arranged in a line which bears at right angles to the line of the lead $a$ and communicate with the side of the heart as contradistinguished from the outer end thereof.

The arrow $i$ in Fig. 1 may be taken to represent the direction of the flood of the tide. Now it will be seen that the fish, striking the lead $a$, will pass offshore along the same and will enter the heart $c$, whereupon, finding themselves entrapped, the fish on turning back against the tide will pass into the pot and crib, since these open directly in the path of the returning fish. This causes the fish to be led naturally into the secondary or final inclosures and the trap does not depend upon the fish being crowded by great numbers behind them and against their natural inclinations.

The trap shown in Fig. 2 is merely a duplication of that shown in Fig. 1, the lead $a'$ having double hooks $b'$, and the heart $c'$ having double jiggers $d'$ and jigger-hooks $e'$, and pots and cribs $f'$ and $g'$ being arranged at each side of the heart $c'$.

Having thus described my invention, I claim as new and desire to secure by Letters Patent—

A fish-trap, comprising a lead, a heart arranged at the offshore end of the lead and having a tunnel leading from one side thereof in a line transverse to the lead, a secondary inclosure communicating with the tunnel and arranged in line therewith transversely to the lead, and a secondary lead passing from the heart at the side of its mouth opposite the side at which the main lead is located, the secondary lead passing transversely of the main lead and terminating in a hook directed inshore.

In testimony whereof I have signed my name to this specification in the presence of two subscribing witnesses.

PEDER M. BENSETH.

Witnesses:
   D. M. BROSSEAU,
   H. J. KNIGHT.